June 12, 1951  B. W. RASINE  2,556,598
PIVOTING HOLDER FOR CAMERAS AND THE LIKE
Filed Oct. 4, 1949
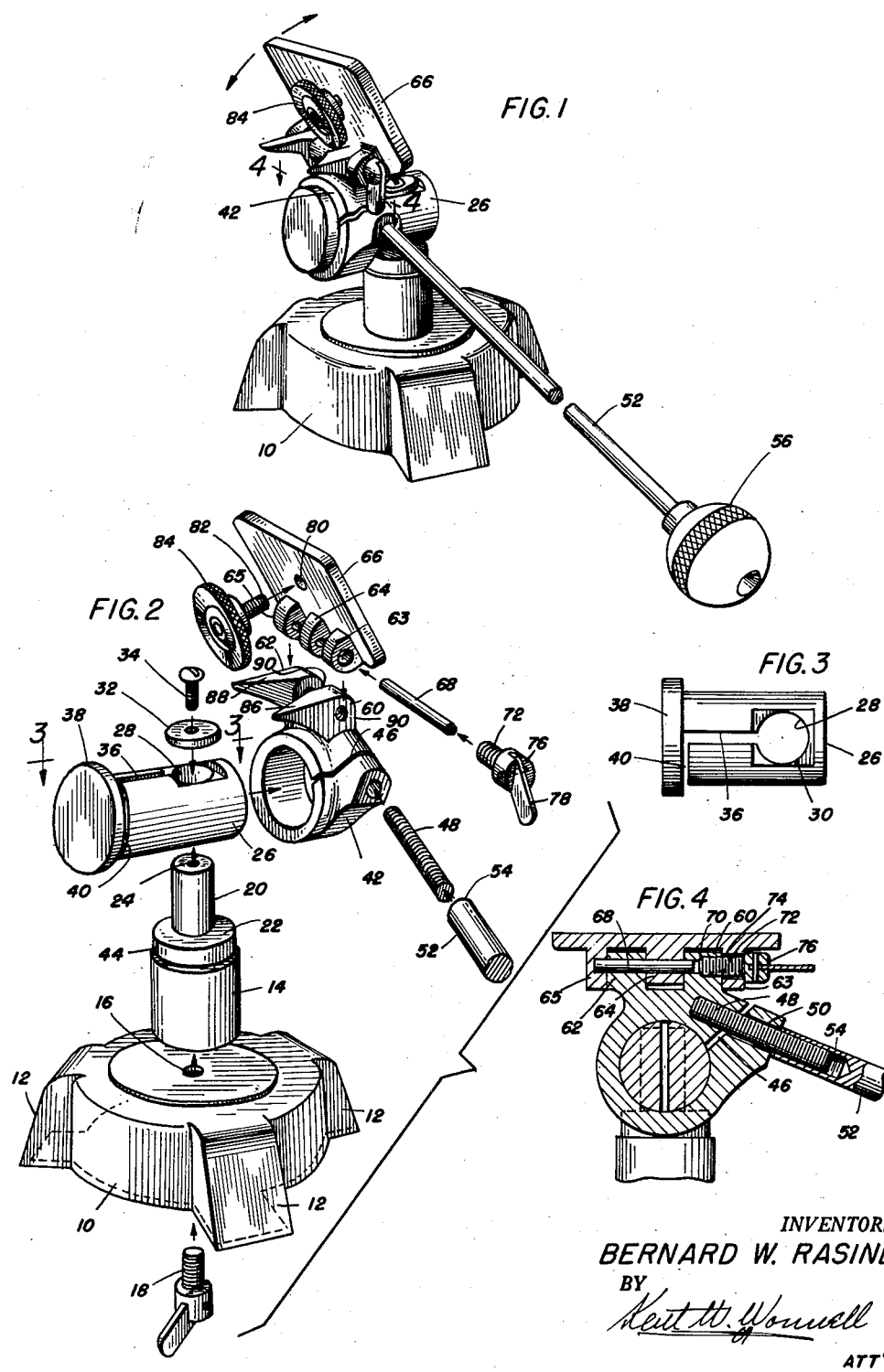
INVENTOR:
BERNARD W. RASINE
BY
ATT'Y Patented June 12, 1951

2,556,598

UNITED STATES PATENT OFFICE 2,556,598

PIVOTING HOLDER FOR CAMERAS AND THE LIKE

Bernard W. Rasine, Chicago, Ill.

Application October 4, 1949, Serial No. 119,487

3 Claims. (Cl. 248—179)

This invention relates in general to a supporting head for cameras, motion picture machines, and the like, and is more particularly described as a tripod mounting for a camera, or for similar devices which is capable of a double adjustment at right angles to each other for a camera, or other support, the support itself, in this case, being readily adjustable from a horizontal to a vertical position for moving a camera or another device supported thereby accordingly, without interfering with any other adjustment of the holder.

An important object of the invention is in attaching an adjustable camera support to a double pivoted mounting so that the mounting can be swung upon axes at right angles to each other and the camera support can be adjusted and held in horizontal, vertical, or any intermediate position.

A further object of the invention is in adapting a hinging camera support to a double pivoting type of holder.

A further object of the invention is to provide a simple attachment for a double pivoting tripod mounting in which the movement of the mounting in axes at right angles to each other is controlled by the rotative movement of a single handle.

Other objects of the invention will appear in the specification and will be apparent from the accompanying drawing in which, Fig. 1 is a perspective view of a pivoting mounting and holder for cameras, in accordance with this invention;

Fig. 2 is an exploded view of the mechanism shown in Fig. 1 omitting a portion of the handle;

Fig. 3 is a top view of one of the pivoting parts taken on the line 3—3 of Fig. 2; and Fig. 4 is a sectional view taken on the line 4—4 of Fig. 1.

In operating motion picture and other cameras, it is frequently desirable to swing the camera about a vertical pivot and also about a horizontal pivot, and at the same time, it may be desirable to swing the camera itself from a horizontal to a vertical position. Heretofore it has been necessary to disconnect the camera from the actual camera support in one position, and to adjust the camera upon the support in the other position. The present invention not only provides for this adjustment without disengaging the camera from the support, but also makes it possible to support the camera at any angle between the vertical and the horizontal positions.

Referring now more particularly to the drawings, a hollow tripod base 10 is provided with three projections 12 into which the legs of a tripod may be inserted or connected in any suitable manner. Disposed centrally on top of the base is a shouldered stem 14 which may be connected through a hole 16 in the base by means of a finger screw 18 extending from the under side of the base through the hole 16 and into the end of the stem 14.

At the upper end of the stem 14 is a reduced pivot 20 with a supporting shoulder 22 at the bottom formed from the stem and with a threaded opening 24 at the top. A bearing member 26 is preferably circular in form and has a transverse bore 28 therethrough adjacent one end adapted to fit closely but freely rotatable upon the pivot 20. The upper side of the bearing member around the bore 28 has a flattened portion 30 for seating a washer 32 therein, the washer having a perforation for receiving a fastening screw 34 which is inserted therethrough into the threaded hole 24 at the upper end of the pivot 20.

Extending from the inner side of the bore 28 of the bearing member toward the opposite end thereof is a slot 36 which terminates at the inside of a head 38 with a connecting slot 40 extending at the inside of the head and diametrically from this end of the slot 36 to one side of the bearing member.

Mounted upon the bearing member between the inside of the head 38 and the bore 28 is a split collar 42 which is larger in diameter than the head 38 so that it bears against the outer and larger periphery of the stem 14 which is preferably provided with a reduced shoulder 44 for engaging the inner edge of the collar 42, the outer edge being engaged by the inside of the head 38 and thus holding the collar in place and against lateral sliding movement. In the collar is a clamping slot 46 normally open so that the sleeve rotates freely upon the bearing member 26, the sleeve having less resistance than the bearing member so that it tightly engages the bearing member before the member is tightly clamped upon the pivot 20.

A threaded stem 48 is inserted freely through an opening 50 in the jaw at one side of the slot 46 and into a jaw at the opposite side of the slot. The stem is fixed into position and projects to the outside of the collar where a rod 52 having an internally threaded extremity 54 is movable upon the threaded stem 48 and against the outer side of the split collar to tighten it upon the bearing member. At the outer end of the rod 52 is a knurled knob 56 by means of which it may be easily turned for clamping the collar or rotating the collar and the bearing member 26 upon the pivot 20.

When the collar is tightly clamped upon the bearing member, a further clamping movement of the collar by means of the rod 52 will engage the split portion of the bearing member 26, clamping it upon the pivot 20, but by varying the resistance of the collar and the bearing member, the collar may first be clamped so that it is not easily turned upon the bearing member allowing the bearing member to rotate quite freely upon its pivot 20 and a further clamping movement of the rod 52 will then cause the bearing member to be clamped upon the pivot 20, thus locking the mounting against horizontal or vertical movement.

At the upper side of the collar, it is provided with spaced projections 60 and 62 to receive corresponding projections 63, 64 and 65 at one edge of a supporting plate 66. The projections 60, 62, 64 and 65 are formed with corresponding openings to receive a pivot pin 68 and one of these projections 60 is provided with a threaded opening 70 to receive a threaded pin 72 which extends freely through an opening 74 in the projection 63. At the outer end of the pin 72 is a head 76 to frictionally engage the outer side of the projection 63 for clamping the plate 66 tightly in any adjusted position. At the outer end of the head 76 is a pivoted finger plate 78 mounted in the slot in the head for readily turning the threaded pin into and out of engaging position.

Located centrally of the supporting plate 66 is an opening 80 through which an attaching threaded stem 82 extends, the stem having a relatively large knurled head 84 which is seated between the projections 60 and 62 in the downward position of the plate and the projections extend outwardly to provide flat supports 86 and 88 at their upper surfaces for engaging the under side of the supporting plate 66 in its lowered position, the inner edges of these projections being cut away toward the ends thereof to seat the head 84 therein.

When the supporting plate is raised to a vertical position, the under portion between the projections 63, 64 and 65 engage flat surfaces 90 at the inner or vertical edges of the projections 60 and 62 to limit the movement of the supporting plate in this direction. Thus the supporting plate is movable in any adjusted position of the mounting from a relatively horizontal position against the surfaces 86 and 88 to a relatively vertical position against the surfaces 90, and by adjusting the threaded pin 72, the plate may be held in either limiting position and at any other angular position between the two limited positions.

Many cameras are provided with threaded openings in sides at right angles to each other so that they may be supported upon a tripod, or other support in a horizontal or a vertical position and by the present support, a camera may be attached by either of these openings and moved without adjustment from a relatively vertical to a horizontal position by correspondingly adjusting the supporting plate.

While this pivoting holder and camera support have been described in some detail, it should be regarded as an example or illustration of the invention as a simple mounting may be employed for other purposes, and various changes in the construction, combination and arrangement of the parts may be made without departing from the spirit and scope of the invention.

I claim:

1. In a pivoting holder for cameras, a mounting base, a double clamping means mounted on the base to swing about vertical and horizontal pivots and comprising a clamping collar, a supporting plate having projections at one side and a pivot extending through the projections for hinging the plate upon the collar, a clamping screw extending through one of the projections into the collar for holding the plate relative to the collar, the collar having projections extending between those of the plate with surfaces at right angles to each other for supporting the plate in two limiting positions at right angles to each other.

2. A pivoting holder for cameras, and the like, comprising a supporting base, a double pivoting and clamping structure including a rotatable collar having projections at one side with upper contact surfaces and with side contact surfaces at right angles thereto, a supporting plate having projections extending between and at the outer of the projections of the collar at one edge of the plate, screw fastening means extending through one of the plate projections engaging the adjacent projection of the collar, a fastening screw having a head at the under side of the plate and located centrally thereof, the inner edges of the collar projections being cut away to receive the head therebetween when the plate is turned against the projections and the under side of the plate engaging the projections at right angles to each other in the corresponding limiting positions.

3. In a pivoting holder for cameras, a support comprising a collar and means for mounting it to rotate upon axes at right angles to each other, the collar having spaced projections at one side, a supporting plate having projections along one edge at the under side of the plate for engaging between and at the outer sides of the collar projections, a pivot pin extending through some of the projections of the plate and collar for hinging the plate to swing from a relatively vertical position to a relatively horizontal position, the plate engaging the projections of the collar to limit the movement of the plate, and a fastening pin extending freely through one outer projection of the plate and threaded into the adjacent projection of the collar, the outer end of the pin having a head engageable with the outer side of the projection of the plate, and the head having a finger plate pivoted therein and extending therefrom for turning the threaded pin into and out of position for locking the plate in any adjusted position relative to the collar.

BERNARD W. RASINE.

REFERENCES CITED

The following references are of record in the file of this patent:

UNITED STATES PATENTS

| Number | Name | Date |
| --- | --- | --- |
| 1,870,766 | Beistle | Aug. 9, 1932 |
| 2,318,633 | Ries | May 11, 1943 |
| 2,318,910 | Zucker | May 11, 1943 |
| 2,323,473 | Korling | July 6, 1943 |